United States Patent [19]

Franksen

[11] Patent Number: 4,486,800

[45] Date of Patent: Dec. 4, 1984

[54] THERMAL METHOD FOR MAKING A FAST TRANSITION OF A SUPERCONDUCTING WINDING FROM THE SUPERCONDUCTING INTO THE NORMAL-CONDUCTING STATE, AND APPARATUS FOR CARRYING OUT THE METHOD

[75] Inventor: Holger Franksen, Erlangen, Fed. Rep. of Germany

[73] Assignee: Siemens Aktiengesellschaft, Berlin and Munich, Fed. Rep. of Germany

[21] Appl. No.: 450,444

[22] Filed: Dec. 16, 1982

[30] Foreign Application Priority Data

Dec. 23, 1981 [DE] Fed. Rep. of Germany ....... 3151119

[51] Int. Cl.[3] ............................................. H02H 9/00

[52] U.S. Cl. ..................................... 361/19; 174/155; 307/306; 335/216; 336/DIG. 1; 361/141

[58] Field of Search ............................ 361/1, 19, 141; 307/306; 336/DIG. 1; 335/216; 174/15 CA, 15 S

[56] References Cited

U.S. PATENT DOCUMENTS

| | | | |
|---|---|---|---|
| 3,458,763 | 7/1969 | Kunzler | 361/19 |
| 4,375,659 | 3/1983 | Cummingham et al. | 361/19 |

OTHER PUBLICATIONS

"Doubler-Tevatron μP Quench Protection System"--Flora et al., IEEE Transactions on Nuclear Science, vol. NS-26, No. 3, 6/79.

"Cryogenics", Aug. 1979, pp. 467 to 471.

*Primary Examiner*—Harry E. Moose, Jr.

*Attorney, Agent, or Firm*—Kenyon & Kenyon

[57] ABSTRACT

A method and apparatus for making a fast transition of the entire superconducting winding of an electrical apparatus, which is arranged in a vacuum chamber and is cooled by a cryogenic medium, from the superconducting operating state into the normal-conducting state by heating the entire winding in case of a disturbance of a section of the winding which causes that section to become normal-conducting is disclosed. A predetermined quantity of a gas which is at a higher temperature and which would be frozen at the superconducting operating temperature is introduced into the vacuum chamber such that the superconducting parts of the winding are heated above the critical transition temperature characteristic for superconduction. The pressure in the spaces containing the cryogenic medium can also be increased by a predetermined value such that boiling of the cryogenic medium is suppressed when the superconducting parts are heated to at least the critical transition temperature.

16 Claims, 1 Drawing Figure

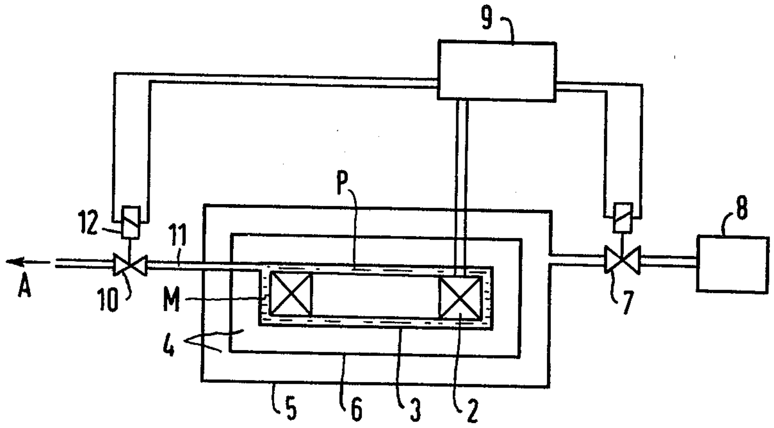
9
P
12
11
8
A
10
M
7
4
5
6
3
2

THERMAL METHOD FOR MAKING A FAST TRANSITION OF A SUPERCONDUCTING WINDING FROM THE SUPERCONDUCTING INTO THE NORMAL-CONDUCTING STATE, AND APPARATUS FOR CARRYING OUT THE METHOD

BACKGROUND OF THE INVENTION

The present invention relates to a method for making a fast transition of the entire superconducting winding of an electric apparatus which is disposed in a vacuum chamber and cooled by a cryogenic medium, from the superconducting operating state into the normal-conducting state by heating the entire winding in the event that at least one winding region which has been superconducting until then, becomes normal-conducting in the case of a disturbance. Such a method is known from the journal "Cryogenics", August 1979, pages 467 to 471. The invention further relates to apparatus for carrying out this method.

In large superconducting windings of electrical apparatus such as magnets or machines, very large amounts of energy can be stored, for instance, $10^9$ Joule. If, in the event of a disturbance, a limited section of the conductor of such a winding change from its superconducting operating state into the normal-conducting state, the danger exists that in this section of the conductor large amounts of energy are converted into the form of heat if normal conduction, also called quench, occurs, so that the conductor section melts through.

In the event of such a disturbance, the supplied energy must therefore in general not be converted locally since this can lead to the destruction of or damage to the winding unless suitable protective measures are taken. Among a number of possible measures, the fast removal of the energy into external parallel resistors is provided for large stabilized magnets. See, e.g., "Cryogenics", June 1964, pages 153 to 165. The removal of energy by inductive means is also known as a protective measure, see, e.g., "Cryogenics", December 1976, pages 705 to 708. The use of these measures, however, may result in technical insulation problems if the stored energies are very large.

It is well known that in the case of a conversion of the energy stored in large magnets into heat, uniformly distributed over the entire winding, the temperature rise connected therewith is relatively small, so that there is no danger of damage to the winding and therefore to the electrical apparatus containing it. If normal conduction occurs in an isolated region of the superconducting winding, one therefore endeavors to convert the stored energy not only in this region, but in the entire winding, by transferring the entire winding into the normal-conducting state as quickly as possible. According to the publication "Cryogenics", August 1979, mentioned above, special heating elements are built into the winding for this purpose, by means of which the entire winding can be heated up uniformly in the event of a disturbance. Arranging suitable heating elements in the winding, however, is relatively expensive and can likewise lead to technical problems with the insulation.

It is therefore an object of the present invention to provide an improved method and apparatus for causing a superconducting winding to make a fast transition to the normal-conducting state.

SUMMARY OF THE INVENTION

This and other objects of the present invention are achieved by introducing into the vacuum chamber surrounding the winding a predetermined quantity of a gas which is at a higher temperature and would be frozen at the superconducting operating temperature such that the superconductive parts of the winding are heated above the critical transition temperature which is characteristic for superconduction.

The warm gas fed into the superconducting winding if a normal-conducting region occurs is then condensed at the surfaces of the winding which are cooled by the cryogenic medium and in the process gives off its stored energy to the latter, i.e., enthalpy and the heat of evaporation. Because of the predetermined quantity of the warm gas, a permanent impairment of the insulating vacuum in the vacuum chamber can be prevented. Via the cryogenic medium which is thus heated appropriately, the entire winding temperature is increased above the transition temperature of the superconductors, so that the parts of the winding which up to then were still superconducting are likewise transferred into the normal-conducting state.

The advantage of the above-described method according to the invention is, in particular, that any superconducting winding can be transferred without problem and very quickly into the normal-conducting state. The process can be used even for windings manufactured by the most complicated winding techniques. Additionally, the method can also be used in already existing electrical apparatus with superconducting windings. No special measures are necessary which would have to be taken into consideration in the design of the winding. In particular, there are no separate electrical leads and therefore, no problems with insulated cold leads, dielectric strength and continuous heat inflow in operation.

It is particularly advantageous if, in a preferred method according to the invention, the pressure is increased in the spaces containing the cryogenic medium by a predetermined amount such that boiling of the cryogenic medium is suppressed when the superconductive parts are heated to at least the critical transition temperature. In spite of the heat fed-in by the warm gas, the cryogenic medium remains in one phase at least until the transition temperature is reached. A good heat exchange between the warmed-up cryogenic medium and the superconductors of the winding can thereby be assured.

The quantity of the warm gas to be introduced and the pressure increase in the coolant spaces which is optionally made depend mainly on the physical extent of the parts of the winding to be heated and on the operating characteristics of the superconductors. For example, if operating characteristics are provided for the superconductors in the normal operating state which are relatively close to the so-called transition point of the superconductive material used, smaller amounts of heat and a smaller pressure increase are required than in the case when the operating state is further removed from the transition point. The transition point of the superconducting material is the point defined in an I-H-T space by the critical current density $I_c$, the critical field strength $H_c$ and the critical transition temperature $T_c$, at which the superconductive material changes from the superconducting to the normal-conducting state. See, for instance, German Offlegungschrift No. 29 01 333.

BRIEF DESCRIPTION OF THE DRAWING

In order to explain the invention and its further embodiments in greater detail, reference is made to the single FIGURE in which a protective device which operates according to the method of the invention is shown for a superconducting magnet coil.

DETAILED DESCRIPTION

According to the schematic embodiment shown in the FIGURE, bath cooling for a superconducting magnet is provided. The stabilized superconductors of its magnet winding 2 are therefore immersed in a vessel 3 in a liquid helium cryogenic medium M which, in the operating condition of the winding, keeps the superconductive material at a temperature below the critical temperature. In order to limit heat inflow from the outside, the vessel 3 with the magnet winding 2 contained therein is surrounded by a vacuum in a vacuum chamber 4 of a vacuum vessel 5. In addition, there is provided in the vacuum chamber 4 a thermal radiation shield 6 which is held by a further coolant at an intermediate temperature between the ambient temperature prevailing outside the vacuum vessel 5 and the cryogenic operating temperature in the vessel 3. This coolant may be, for instance, helium exhaust gas from the vessel 3 with a temperature of about 20° K. or liquid nitrogen of about 78° K.

So that the entire magnet winding can be transferred in the event of a disturbance from the superconducting operating state into the normal-conducting state in accordance with the invention, a supply tank 8 is connected which can be switched on by means of a magnetic valve 7. In this supply tank, a predetermined quantity of a warm gas is stored which would be frozen at the superconducting operating temperature of the winding 2. This gas, the temperature of which is presently at least 100° K. higher than the transition temperature of the superconductive material may, for instance, be water-free nitrogen gas at room temperature. If quench occurs, i.e., a transition from the superconducting to the normal-conducting state is detected in a region of the magnet winding 2 by means of an electronic circuit 9, the magnetic valve 7 is opened by the electronic circuit and the warm gas flows from the tank 8 into the vacuum chamber 4. It is there condensed at the helium-cold surfaces of the vessel 3, giving off its enthalpy and heat of evaporation to the helium bath. At the same time the radiation shield 6 is also heated. Simultaneously with the introduction of the warm gas, the pressure p so far prevailing in the vessel 3 is preferably increased therein by a predetermined value. This can be done, for instance, by interrupting or throttling the discharge of the exhaust gas A generated in the vessel 3. This purpose is served by a throttling valve 10 in a corresponding exhaust gas line 11 which is adjusted by a positioner 12 which is likewise controlled by the electronic circuit 9. Optionally, a pressure increase can also be obtained if helium gas is fed with increased pressure to the pressure chamber of the helium bath contained in the vessel 3, for instance, by adding a supplemental volume with pressure. It is achieved by these measures that in spite of the increased temperature of the helium bath in the vessel 3, boiling of the helium is prevented by means of the added helium supply, at least until the entire winding has reached the critical transition point of the superconductive material. Because of the low heat capacity and the accomplished pressure increase in the helium bath, the helium vessel 3 and the helium itself are heated up very quickly. The parts of the winding which are in direct thermal contact with the cooling helium are thereby warmed up beyond their critical temperature so that uniform spreading of the quench from them over the entire magnet winding can be ensured within a very short time.

While means for increasing the pressure are provided in the protective device shown in the FIGURE in the spaces containing the cryogenic medium M, i.e., in the vessel 3, these means can optionally be dispensed with when using the method according to the invention if advantage is taken of the better heat conduction of the helium gas occurring in the event of boiling as compared to liquid helium.

The method according to the invention can be applied to advantage in any superconducting magnets without the necessity for special design measures in the layout of the windings. As an example, assume that a known bath-cooled superconducting magnet is provided (see, e.g., "Eisenbahn-technische Rundschau", Vol. 27, No. 3, 1978, pages 150 to 153). In this magnet, an energy of 2 MJ can be stored at a rated current of 1,000 A and an effective current density in the winding of 86 $A/mm^2$. With about 270 g dry nitrogen gas, i.e., about 200 liters at room temperature at 1 bar, the entire magnet winding can be transferred from the superconducting to the normal-conducting state within 600 msec, without causing dangerous overheating of individual parts of the winding. By introducing the warm nitrogen gas into the vacuum chamber of the magnet the temperature of the radiation shield provided therein is also increased from approximately 20° K. to about 80° K.

According to the embodiment shown in the FIGURE, bath cooling is provided for the superconducting magnet winding 2. The method according to the invention, however, is also equally well suited to forced-draft cooled superconducting magnet windings, i.e., the spaces containing the cryogenic medium M are not, as in the case of bath cooling, a bath cryostat or the vessel 3, but the cavities in or at the superconductors through which the cryogenic medium is transported. Such magnet windings are also surrounded by a vacuum space into which a predetermined quantity of a warm gas can be introduced for the short-time release of a general quench. With this cooling method, the pressure in the helium loop can at the same time be increased at the individual conductors. This can be achieved, for instance, by the provision that the helium discharge from the loop is throttled or helium with increased pressure is fed into the loop.

As a further example, the method according to the invention is provided for a known superconducting magnet which can be cooled by a forced draft (see "Handbuch Supraleitungstechnik", VDI-Bildungswerk BW No. 41-08-01 (BW 2802), October 1974, Contribution 12, pages 1 to 9 or "5th International Cryogenic Engineering Conference" May 1974, Kyoto, Japan, Report B2, pages 28 to 34). This magnet with copper-stabilized NbTi conductors can carry a normal current of 500 A at 3.5 T and 4.5 K, the effective current density in the winding being about 81 $A/mm^2$. The magnetic energy stored in the magnet winding is 120 kJ. With approximately 80 g nitrogen, i.e., approximately 60 liters at room temperature and 1 bar, the helium cooling the magnet winding can be warmed up by about 1° K. within 600 msec. This temperature increase is generally sufficient to change the entire magnet winding from the superconducting to the normal-conducting state.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a method for making a fast transition of the entire superconducting winding of an electrical apparatus which is cooled by a cryogenic medium contained in spaces around or through the winding and disposed in a vacuum chamber, the transition being made from the superconducting operating state to the normal-conducting state by heating the entire winding in the event that part of the superconducting winding becomes normal-conducting due to a disturbance, the improvement comprising the step of:

introducing a predetermined quantity of a gas which is at a higher temperature and would be frozen at the superconducting operating temperature into the vacuum chamber such that the superconducting parts of the winding are heated above the critical transition temperature characteristic for superconduction.

2. The improvement recited in claim 1, further comprising the step of increasing the pressure in the spaces containing the cryogenic medium by a predetermined value such that boiling of the cryogenic medium is suppressed if the superconducting parts are heated to at least the critical transition temperature.

3. The improvement recited in claim 1 wherein the gas which is introduced into the vacuum chamber has a temperature which is at least 100° K. above the critical transition temperature.

4. The improvement recited in claim 3 wherein the gas is at room temperature.

5. The improvement recited in claim 1 wherein the gas is water-free nitrogen.

6. The improvement recited in claim 2 wherein the pressure in the spaces containing the cryogenic medium is increased by adding a supplemental volume with pressure to the cryogenic medium.

7. The improvement recited in claim 2 wherein the pressure in the spaces containing the cryogenic medium is increased by throttling the exhaust gas flow from that spaces containing the cryogenic medium.

8. In an apparatus for making a fast transition of the entire superconducting winding of an electrical apparatus which is cooled by a cryogenic medium contained in spaces around or through the winding and disposed in a vacuum chamber, the transition being made from the superconducting operating state to the normal-conducting state by heating the entire winding in the event that part of the superconducting winding becomes normal-conducting due to a disturbance, the improvement comprising:

means for introducing a predetermined quantity of a gas which is at a higher temperature and which would be frozen at the superconducting operating temperature into the vacuum chamber such that the superconducting parts of the winding are heated above the critical transition temperature characteristic for superconduction.

9. The improvement recited in claim 8, further comprising means for increasing the pressure in the spaces containing the cryogenic medium by a predetermined value such that boiling of the cryogenic medium is suppressed if the superconducting parts are heated to at least the critical transition temperature.

10. The improvement recited in claim 8 wherein the gas which is introduced into the vacuum chamber has a temperature which is at least 100° K. above the critical transition temperature.

11. The improvement recited in claim 10 wherein the gas is at room temperature.

12. The improvement recited in claim 8 wherein the means for introducing comprise a supply vessel having a predetermined quantity of gas, said supply vessel coupled to the vacuum chamber.

13. The improvement recited in claim 12 wherein the gas is water-free nitrogen.

14. The improvement recited in claim 9 wherein the means for increasing the pressure in the spaces containing the cryogenic medium comprises means for adding a supplemental volume with pressure to the cryogenic medium.

15. The improvement recited in claim 9 wherein the means for increasing the pressure in the spaces containing the cryogenic medium comprises means for throttling the exhaust gas flow from that spaces containing the cryogenic medium.

16. The improvement recited in claim 8, further comprising means for detecting if parts of the superconducting winding becomes normal-conducting and means coupled to said means for detecting for feeding the predetermined quantity of gas into the vacuum chamber if part of said winding becomes normal-conducting.

* * * * *